United States Patent
Lee et al.

(10) Patent No.: US 9,783,920 B2
(45) Date of Patent: Oct. 10, 2017

(54) LAUNDRY TREATING APPARATUS AND METHOD FOR CONTROLLING THE SAME

(71) Applicant: LG ELECTRONICS INC., Seoul (KR)

(72) Inventors: Hoonbong Lee, Changwon-si (KR); Hansu Jung, Changwon-si (KR); Suncheol Bae, Changwon-si (KR)

(73) Assignee: LG ELECTRONIC INC., Seoul (KR)

( * ) Notice: Subject to any disclaimer, the term of this patent is extended or adjusted under 35 U.S.C. 154(b) by 549 days.

(21) Appl. No.: 14/458,602

(22) Filed: Aug. 13, 2014

(65) Prior Publication Data
US 2015/0047219 A1    Feb. 19, 2015

(30) Foreign Application Priority Data
Aug. 14, 2013  (KR) .......................... 10-2013-0096745

(51) Int. Cl.
| G05B 13/00 | (2006.01) |
| D06F 39/00 | (2006.01) |
| D06F 58/28 | (2006.01) |
| D06F 33/02 | (2006.01) |

(52) U.S. Cl.
CPC ............ D06F 39/003 (2013.01); D06F 33/02 (2013.01); D06F 58/28 (2013.01); D06F 2058/2861 (2013.01); D06F 2058/2877 (2013.01); D06F 2202/10 (2013.01); D06F 2202/12 (2013.01); Y02B 40/72 (2013.01)

(58) Field of Classification Search
CPC .... D06F 35/006; D06F 37/304; D06F 39/003; D06F 33/02; D06F 2202/10; D06F 2058/2861; D06F 37/203
See application file for complete search history.

(56) References Cited

U.S. PATENT DOCUMENTS

| 2005/0086742 A1* | 4/2005 | Kim ...................... D06F 39/003 8/158 |
| 2006/0021392 A1 | 2/2006 | Hosoito et al. |
| 2007/0145941 A1* | 6/2007 | Asada ................... D06F 37/304 318/811 |
| 2008/0196172 A1* | 8/2008 | Jeong ...................... D06F 33/02 8/159 |

(Continued)

FOREIGN PATENT DOCUMENTS

| CN | 101591847 A | 12/2009 |
| EP | 2 128 325 A2 | 12/2009 |

(Continued)

OTHER PUBLICATIONS

European Search Report issued in application No. 14180844.4 dated Jan. 12, 2015.

(Continued)

*Primary Examiner* — Tuan Vu
(74) *Attorney, Agent, or Firm* — KED & Associates LLP

(57) ABSTRACT

A method is provided for controlling a laundry treating apparatus. The method may include controlling the drum to accelerate the drum to rotate at a first speed, applying a brake to stop the drum, accelerating the drum to a second speed, sensing a current being applied to the motor while the drum is accelerated to the second speed, and determining a laundry amount based on the sensed current.

14 Claims, 6 Drawing Sheets

(56) References Cited

U.S. PATENT DOCUMENTS

| | | | |
|---|---|---|---|
| 2008/0289118 A1* | 11/2008 | Park | D06F 37/203 8/159 |
| 2009/0307851 A1* | 12/2009 | Bae | D06F 35/006 8/159 |
| 2010/0031451 A1 | 2/2010 | Bae et al. | |
| 2011/0047717 A1* | 3/2011 | Cho | D06F 33/02 8/137 |
| 2012/0005840 A1 | 1/2012 | Jang et al. | |
| 2012/0324654 A1 | 12/2012 | Koo et al. | |

FOREIGN PATENT DOCUMENTS

| | | |
|---|---|---|
| KR | 10-1999-0047136 | 7/1999 |
| KR | 10-0264037 | 8/2000 |
| KR | 10-2005-0046805 | 5/2005 |
| KR | 10-2009-0122804 | 12/2009 |
| KR | 10-2011-0023061 | 3/2011 |
| KR | 10-1156710 | 6/2012 |
| WO | WO 2011/025339 A2 | 3/2011 |

OTHER PUBLICATIONS

European Search Report issued in application No. 14180846.9 dated Jan. 13, 2015.
Korean Office Action for Application 10-2013-0096744 dated Oct. 1, 2015.
Korean Office Action for Application 10-2013-0096745 dated Oct. 1, 2015.
Chinese Office Action issued in Application 2014104000008.7 dated Feb. 3, 2016 (full Chinese text).

* cited by examiner

LAUNDRY TREATING APPARATUS AND METHOD FOR CONTROLLING THE SAME

CROSS-REFERENCE TO RELATED APPLICATION

This application claims priority under 35 U.S.C. §119 to Korean Application No. 10-2013-0096745, filed Aug. 14, 2013, the subject matter of which is hereby incorporated by reference.

BACKGROUND

1. Field

Embodiments may relate to a laundry treating apparatus and a method for controlling the same.

2. Background

In general, a laundry treating apparatus, a machine for applying physical and chemical actions to laundry or clothes to treat the same, calls a washing machine for removing dirt from the laundry, a spin-dryer for spinning a drum holding the laundry therein for extracting water from the laundry, and a dryer for applying cold or heated air to the drum for drying wet laundry, collectively.

The laundry treating apparatus may detect an amount of laundry (hereinafter called a laundry amount) introduced to the drum before performing an operation, such as washing, rinsing, spinning, drying, and etc., and sets an amount of water supply, an operation course, and an operation time period according to the detected laundry amount.

The laundry amount detection may be made by using a principle in which a load on a motor varies with the laundry amount and a current applied to the motor for rotating the drum varies with the load. However, since the load on the motor varies, not only with the load on the motor, but also with a state of clothes in the drum, there has been a problem in that a detected laundry amount shows a variation.

SUMMARY OF THE INVENTION

Embodiments may provide a laundry treating apparatus and a method for controlling the same that may accurately sense the laundry amount. Embodiments may provide a laundry treating apparatus and a method for controlling the same that can eliminate an influence of a state of clothes introduced to the drum to determination of the laundry amount for determining more accurate laundry amount.

Embodiments may provide a method for controlling a laundry treating apparatus having a drum rotatably provided for holding clothes, and a motor for rotating the drum. The method may include a first speed rotating for controlling the drum to accelerate the drum to rotate at a first speed, a braking for applying a brake to stop the drum, a second speed accelerating for accelerating the drum to a second speed, a current sensing for sensing a current being applied to the motor during the drum is accelerated to the second speed, and a laundry amount determining for determining a laundry amount based on the current sensed in the current sensing.

Embodiments may provide a laundry treating apparatus including a drum rotatably provided for holding clothes, a motor for rotating the drum, a motor control unit for applying a brake to stop the motor after controlling the motor to rotate the drum at a first speed, and controlling the motor to make the drum to again accelerate to a second speed, a current sensing unit for sensing a current being applied to the motor during the motor is controlled by the motor control unit, and a laundry amount sensing unit for determining a laundry amount based on a current value sensed at the current sensing unit during the drum is accelerated to the second speed.

The laundry treating apparatus and the method for controlling the same may have an effect of determining a more accurate laundry amount by minimizing influence of an initial stage of the clothes introduced to the drum to a current value being applied to the motor, because the current value being applied to the motor is sensed after rotating the drum for changing the state of the clothes introduced to the drum.

The laundry treating apparatus and the method for controlling the same may have an effect of making the laundry amount sensed become a reliable index that reflects an actual laundry amount even when the clothes are introduced to the drum in a non-uniform state by the user.

BRIEF DESCRIPTION OF THE DRAWINGS

Arrangements and embodiments may be described in detail with reference to the following drawings in which like reference numerals refer to like elements and wherein.

DETAILED DESCRIPTION

Advantages, features and methods for achieving those of embodiments may become apparent upon referring to embodiments described later in detail together with attached drawings. However, embodiments are not limited to the embodiments disclosed hereinafter, but may be embodied in different modes. The embodiments are provided for perfection of disclosure and informing a scope to persons skilled in this field of art. The same reference numbers may refer to the same elements throughout the specification.

Figure 1:
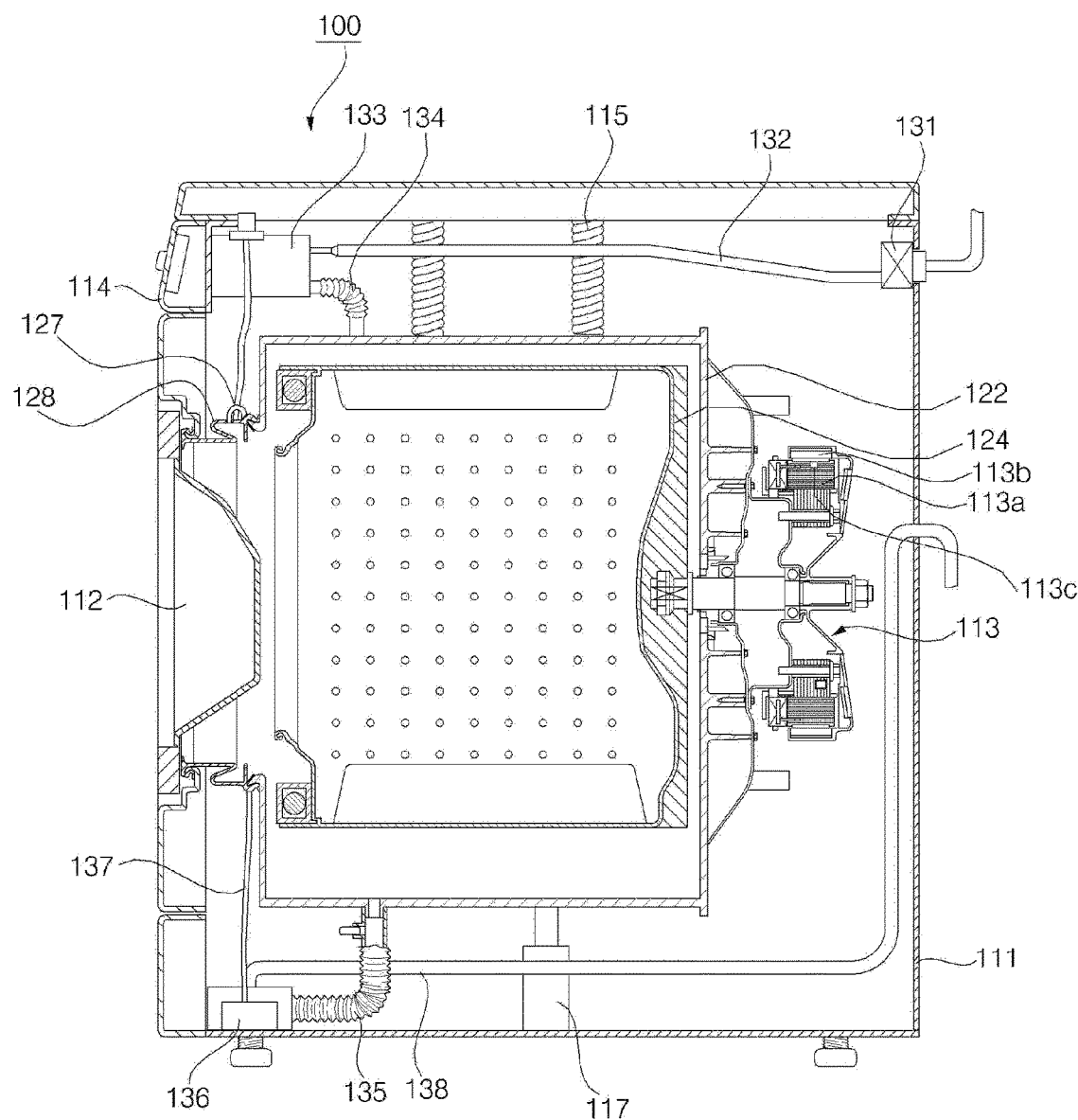
FIG. 1 is a sectional view illustrating a laundry treating apparatus in accordance with an example embodiment.
Figure 2:
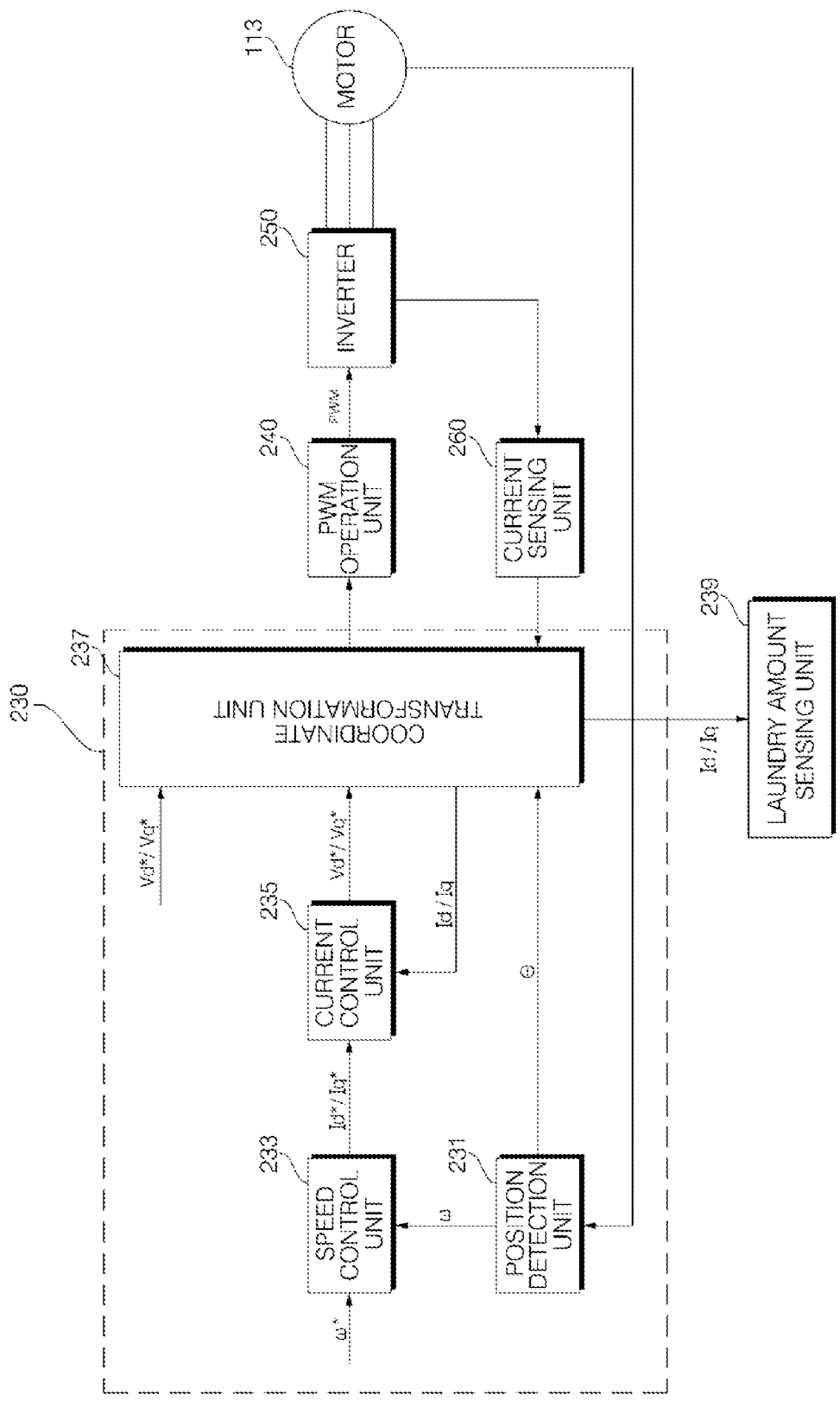
FIG. 2 is a block diagram illustrating control relations among major elements of the laundry treating apparatus in FIG. 1.

FIG. 1 is a sectional view illustrating a laundry treating apparatus in accordance with an example embodiment. FIG. 2 is a block diagram illustrating control relations among major elements of the laundry treating apparatus in FIG. 1. Other embodiments and configurations may also be provided.

Referring to FIG. 1, a laundry treating apparatus 100 may include a casing 111 having a clothes introduction opening 111*a* formed therein, a door 112 for opening/closing the clothes introduction opening 111*a*, a tub 122 arranged in the casing 111, a drum 124 rotatably provided in the tub 122 for holding clothes introduced thereto through the clothes introduction opening 111a, a motor 113 for rotating the drum 124, a detergent box 133 for holding detergent, and a control panel 114.

The cabinet 111 may have the door 112 rotatably coupled thereto for opening/closing the clothes introduction opening 111a. The cabinet 111 may have the control panel 114 provided thereto. The cabinet 111 may have the detergent box 133 drawably provided thereto.

The tub 122 may be arranged in the cabinet 111 to be able to be buffered with a spring 115 and a damper 117. The tub 122 may hold washing water. The tub 122 may be arranged to an outside of the drum 124 to surround the drum 124.

The motor 113 may generate a torque for rotating the drum 124. The motor 113 may rotate in a regular direction or a reverse direction, for rotating the drum 124 in different speeds or directions.

The drum 124 may be rotated, with the clothes held therein. The drum 124 may be arranged in the tub 122. The drum 124 may be formed in a rotatable cylindrical shape. The drum 124 may have a plurality of pass through holes for passing the washing water. The drum 124 may rotate upon having torque of the motor 113 forwarded thereto.

A gasket 128 may seal between the tub 122 and the cabinet 111. The gasket 128 may be arranged between the inlet of the tub 122 and the clothes introduction opening 111a. The gasket 128 may attenuate an impact forwarded to the door 112 when the drum 124 rotates as well as prevent the washing water from leaking to an outside of the tub 122. The gasket 128 may have a circulating nozzle 127 provided thereto for introduction of the washing water to an inside of the drum 124.

The detergent box 133 may hold detergent, such as washing detergent, fiber softener or bleaching agent. The detergent box 133 may be drawably provided to a front side of the cabinet 111. The detergent in the detergent box 133 may be introduced to the tub 122 mixed with the washing water when the washing water is supplied to the tub 122.

Provided to an inside of the cabinet 111, there may be a water supply valve 131 for controlling introduction of the washing water from an external water source, a water supply passage 132 for flow of the washing water being introduced to the water supply valve to the detergent box 133, and a water supply pipe 134 for introduction of the washing water having the detergent mixed therewith at the detergent box 133 to the tub 122.

Provided to the inside of the cabinet 111, there may be a drain pipe 135 for draining the washing water from the tub 122, a pump 136 for draining the washing water from the tub, a circulating flow passage 137 for circulation of the washing water, a circulating nozzle 127 for introduction of the washing water to the drum 124, and a drain flow passage 138 for draining the washing water to an outside of the laundry treating apparatus. Depending on embodiments, the pump 136 may be a circulating pump and a drain pump connected to the circulating flow passage 137 and the drain flow passage 138, respectively.

The motor 113 may include a stator 113a having coils wound thereon, a rotor 113b for rotating owing to electromagnetic reaction with the coil, and a hall element 113c for sensing a position of the rotor 113b.

Referring to FIG. 2, the laundry treating apparatus may include a motor control unit 230, a PWM operation unit 240, an inverter 250, and a current sensing unit 260.

The motor control unit 230 may control power to be applied to the motor 113. The motor control unit 230 may include a position detection unit 231, a speed control unit 233, a current control unit 235, and a coordinate transformation unit 237.

The motor 113 may include the hall element 113c for detecting a position of the rotor. The hall element may include an N type semiconductor for measuring strength of a magnetic field by using a hall effect. For an example, if the hall element has a current $I_H$ flowing thereto and magnetic flux B applied to a surface of the hall element perpendicular to a direction of the current, a voltage $V_H$ may be generated in a direction perpendicular to the magnetic flux B proportional to the current $I_H$ and a magnitude of the magnetic flux B. Since the hall element can detect N, S poles and magnitudes thereof from the voltage $V_H$ generated thus, the hall element can detect a position of the rotor that is a permanent magnet of a PMSM (Permanent Magnet Synchronous Motor) or BLDC (Brushless DC electric Motor). Moreover, since the hall element 113c generates the voltage $V_H$ proportional to the magnitude of the magnetic flux B, enabling to detect current intensity that generates the magnetic flux, the hall element may also be used as a current sensor.

The position detection unit 231 may detect a position of the drum 124 based on the position of the rotor 113b sensed by the hall element 113c. The position detection unit 231 may also detect a rotation speed of the drum 124 based on the position of the rotor 113b or the drum 124 detected thus. The position detection unit 231 may detect the rotation speed of the motor 113 by using the current that the current sensing unit 260 senses.

The position of the rotor 113b detected with the hall element 113c (i.e., a rotation angle θ of the drum 124) may have a smallest unit varied with a number of the permanent magnets mounted to the rotor 113b. The embodiment may suggest, but is not limited to, 15° as a smallest unit of angle.

The speed control unit 233 may subject the rotation speed of the rotor 113b detected at the position detection unit 231 to proportional integral control PI for forwarding a command current that is to make the rotation speed ω to follow a command speed ω*. On a d-q axes rotating coordinate system having a d-axis parallel to a direction of the magnetic flux and a q-axis perpendicular to the d-axis, the command current forwarded by the speed control unit 233 may be expressed with a vector sum of a d-axis command current Id* and a q-axis command current Iq*.

The current control unit 235 may subject the present currents Id, Iq the current sensing unit 260 detects to proportional integral control PI to make the present currents Id, Iq to follow the command currents Id*, Iq*, to generate a d-axis command voltage Vd*, and a q-axis command voltage Vq*.

The coordinate transformation unit 237 may transform the d-q axes rotating coordinate system to a uvw fixed coordinate system and vice versa. The coordinate transformation unit 237 may transform the command voltage Vd*/Vq* applied thereto in the d-q axes rotating coordinate system to three phase command voltages. The coordinate transformation unit 237 may transform the present current in the fixed coordinate system (the current sensing unit 260 senses to be described later) to the d-q axes rotating coordinate system. The rotating coordinate system may be a rotor reference frame rotating in synchronization with the speed of the rotor 113b. The coordinate transformation unit 237 may transform a coordinate based on a position θ of the drum 124 that the position detection unit 231 detects.

The PWM (Pulse Width Modulation) operation unit 240 has a signal of the uvw fixed coordinate system applied thereto from the motor control unit 230 for generating a PWM signal.

The inverter 250 is a converter for generating AC power of a variable voltage and a variable frequency from fixed or variable DC power. The inverter 250 receives a PWM signal from a PWM operation unit 240 for controlling power to be directly applied to the motor 133. The inverter 250 may control, not only a frequency of AC output power, but also an output voltage of the AC output power. Depending on embodiments, the PWM operation unit 240 may be included to the inverter 250. Such an inverter may be called a PWM inverter.

The PWM operation unit 240 may generate gating pulses of each phase switch for generating a fundamental voltage having a volt-second average and a frequency the same with command voltages Vd* and Vq* with the inverter 250. Additionally, a switching pattern may be determined to minimize unnecessary harmonics and switching losses, and as PWM techniques for this, optimal/programmed PWM, carrier based PWM, space vector PWM, and so on are known well.

The laundry treating apparatus may perform operations or washing, rinsing, spinning, and drying according to setting to the control panel 114, for performing an operation optimized to an amount of the clothes by setting detailed variables, such as a water supply amount, a rotation speed of the drum 124, a rotation pattern, an operation time period according to the amount of clothes (laundry amount) introduced to the drum 124. The laundry treating apparatus may sense the laundry amount before performing respective operations. Embodiments described hereinafter describe the operations for sensing the laundry amount, wherein the laundry amount is not only sensed before performing any stroke of the washing, rinsing, spinning, and drying, but also performed in middle of progress of the stroke. The operations may be applied, not only to a case when a dry laundry amount is sensed before the water supply is made to the drum 124, but also to a case when a wet laundry amount is sensed after the water supply is made to the drum 124.

A laundry amount sensing unit 239 may determine the laundry amount based on a current. The laundry amount may be determined based on a present current Id, Iq sensed by a current sensing unit 260, and depending on embodiments, not only the present currents, but also a counter electromotive force may be taken into account, altogether.

Figure 3:
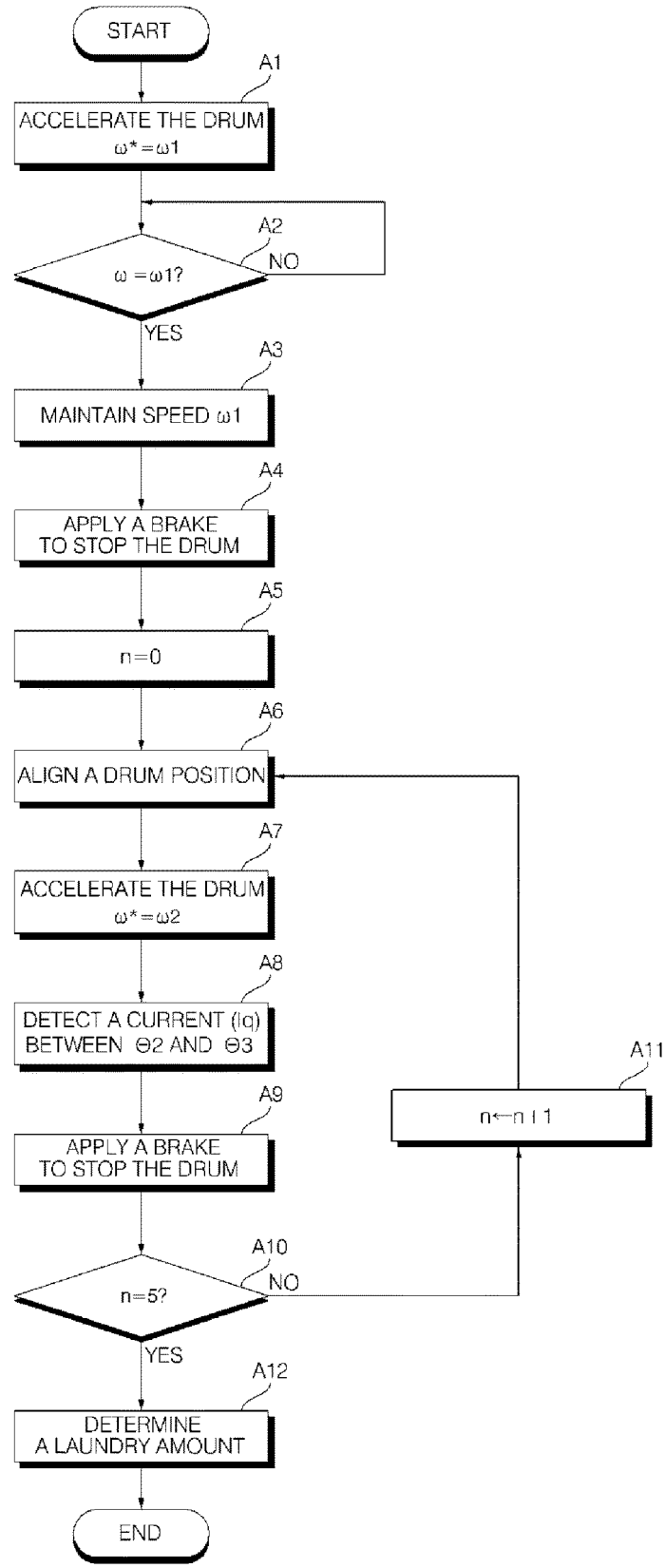
FIG. 3 is a flow chart illustrating a method for controlling a laundry treating apparatus in accordance with an example embodiment.
Figure 4:
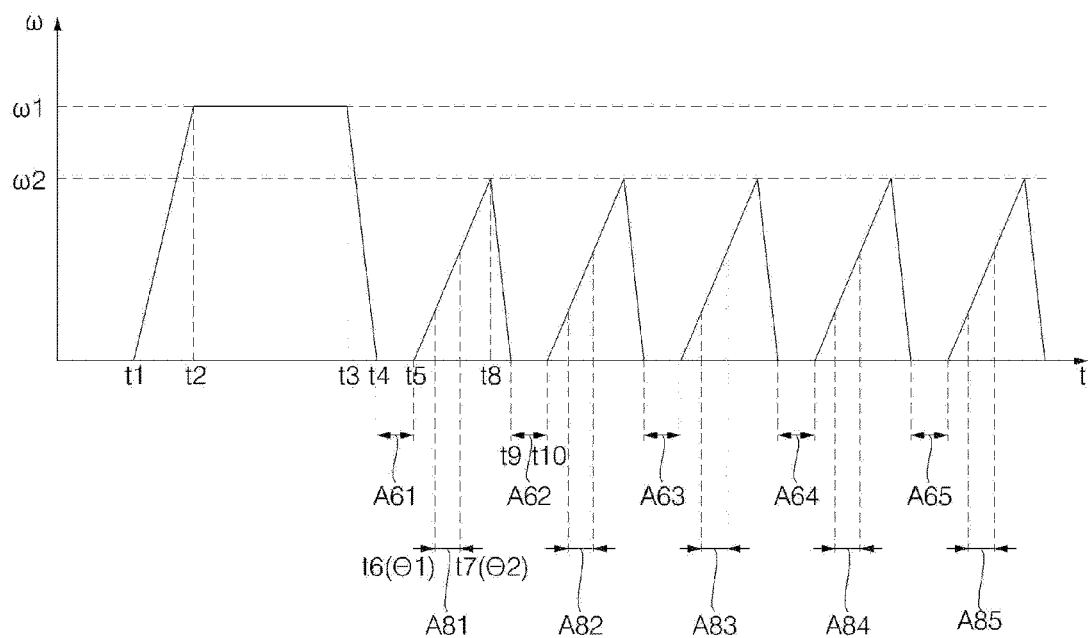
FIG. 4 is a graph illustrating time vs. rotation speed of a drum when a laundry treating apparatus is operated according to a control method in accordance with an example embodiment.
Figure 5:
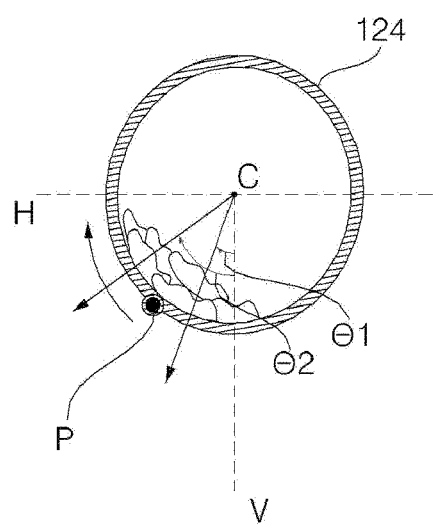
FIG. 5 is a sectional view illustrating current sensing sections.

FIG. 3 is a flow chart illustrating a method for controlling a laundry treating apparatus in accordance with an example embodiment. FIG. 4 is a graph illustrating time vs. rotation speed of a drum when a laundry treating apparatus is operated according to a control method in accordance with an example embodiment. FIG. 5 is a sectional view illustrating current sensing sections. A method for controlling a laundry treating apparatus in accordance with example embodiments will be described, with reference to FIGS. 3 to 5. Other embodiments and configurations may also be provided.

The clothes may be introduced to the drum 124 and the drum 124 may be accelerated (A1, [t1, t2]). A command speed $\omega^*$ applied to a speed control unit 233 is a first speed $\omega 1$, and a rotation speed $\omega$ of the drum 124 may rise (or increase) following the first speed $\omega 1$. The first speed $\omega 1$ is a speed that can change a clothes state in the drum 124, required to make at least some of the clothes held in the drum 124 to move, and may be set between 46 rpm to 60 rpm, for example.

If the rotation speed $\omega$ of the drum 124 sensed at a position detection unit 231 reaches the first speed $\omega 1$ (A2), the speed control unit 233 controls the drum 124 to rotate at a fixed speed of the first speed $\omega 1$ (A3, [t2, t3]) by a proportional integral control (PI).

If a certain time period is passed from the t2 to reach the t3, a brake may be applied to the motor 113 to stop the drum 124 (A4, [t3, t4]). A braking system of the drum 124 may be regenerative braking or dynamic braking.

For counting a number of repetitions of current sensing (A8, A9) to be described later, an 'n' is set to zero (A5).

At a position aligning section [t4, t5] before the drum 124 stopped thus is accelerated again, a position of the drum 124 may be aligned (A6, A61). Magnetization of the stator 113a can be made to make the rotor 113b to be at a regular position, when a d-axis current may be output from a current control unit 235. In this process, resistance of the motor 113 and an error of voltage information may be sensed. The position alignment of the drum 124 may also be performed at a position aligning section A62, A63, A64, A65 between acceleration to a second speed $\omega 2$ (to be described later) is repeated.

When the same command speed $\omega^*$ is requested, in order to make the present speed $\omega$ to follow the command speed, a torque value generated by the motor 113 is required to vary with the laundry amount. In view of the current, the current applied to the motor 113 is required to vary with the laundry amount. Accordingly, the current applied to the motor 113 may be an index that reflects the laundry amount.

Although the laundry amount may be determined based on the current detected at any section in which the rotation of the drum 124 is made, preferably, the laundry amount may be determined based on the current applied to the motor 113, which is sensed at a section in which the clothes are lifted by rotation of the drum 124. Determination of the laundry amount may be made at the laundry amount sensing unit 239.

The current applied to the motor 113, a present current forwarded from the inverter 250, may be sensed by the current sensing unit 260. The present current value may be expressed with a d-axis present current Id and a q-axis present current Iq on a d-q rotating coordinate system. Additionally, of the d-axis present current Id and q-axis present current Iq, since a component that generates the torque for rotating the rotor 113b is the q-axis component mostly, the laundry amount is preferably determined based on the q-axis present current Iq.

Additionally, although a value sensed starting from a time point the current is applied to the motor 113 for rotating the drum 124 from a stationary state may be used as the present current required for determining the laundry amount, the present current value sensed at an initial stage of the rotation of the drum 124 can not reflect the laundry amount accurately due to different reasons, such as a degree of magnetization of the stator 113a, a state of arrangement of the clothes in the drum 124, and etc. Consequently, the laundry amount may be determined based on the present current value sensed after the drum 124 is rotated to a certain extent from the stationary state.

Referring to FIG. 3 again, operations for determining the laundry amount may be described in more detail.

The drum 124 may be accelerated from a stationary state (A7, [t5, t9]). The command speed $\omega^*$ applied to the speed control unit 233 is a second speed $\omega 2$, and the rotation speed $\omega$ of the drum 124 rises (or increases) following the second speed $\omega 2$. The second speed $\omega 2$ may be set lower than the first speed $\omega 1$, for an example, 46 rpm.

In this example, it is not required to accelerate the drum 124 until the drum 124 reaches the ω2 which is the command speed, without fail. That is, although FIG. 4 illustrates that braking of the drum 124 is made after the drum 124 reaches the command speed ω2 in each of the acceleration operations, this is no more than illustrative one, and it will be adequate if the drum 124 is accelerated following a predetermined command speed in the acceleration operation. It is preferable that the command speed in each of the acceleration operations has the same value.

Moreover, even if a highest value of the rotation speed may not reach the command speed ω2 depending on a drive time period of the motor 113 in the acceleration operation, even in this example, it is preferable that the highest value is lower than the first speed ω1.

Referring to FIG. 5, while the drum 124 is being accelerated, the present current Id/Iq is measured (A8) at a section (A81) in which a position of the drum 124 changes from a first rotation angle θ1 to a second rotation angle θ2. As described before, the laundry amount may be determined based on the q-axis present current value Iq of the present current values. Then, the brake may be applied to stop the drum 124 (A9 [t8, t9]).

FIG. 5 illustrates position changes of the drum 124 according to drive of the motor 113 (i.e., changes from the first rotation angle θ1 to the second rotation angle θ2). P illustrates the lowest point of the drum 124 having a position aligned in a stationary state and may hereafter be called a reference point. FIG. 5 illustrates a state in which the reference point is moved up between the rotation angles θ1 and θ2 as the drum 124 rotates in a clockwise direction from the stationary state. H denotes a horizontal line passing through a center C of the drum 124, and V denotes a vertical line the reference point P is positioned thereon in the stationary state of the drum 124. The current sensing section may be defined as a section from the first rotation angle θ1 to the second rotation angle θ2.

The laundry amount may have a distribution according to a state of the clothes introduced to the drum 124. The clothes introduced to the drum 124 may be placed in the drum 124 to one side thereof, and particularly, placed in the drum 124 gathered to a front side thereof having the laundry introduction opening 111a frequently, rather than placed in the drum 124 deep in a rear side of the drum 124. If the drum 124 is accelerated from such a state directly and the current is sensed at the current sensing section, a load larger than an actual load is applied to the motor 113 due to factors, such as eccentricity of the clothes, and friction force acting between the clothes and the door 112, making the present current value sensed at this time to fail to reflect an accurate laundry amount, consequently. In order to solve such a problem, in a method for controlling a laundry treating apparatus in accordance with an example embodiment, after changing a state of the clothes in the drum 124 by rotating the drum 124 at the first speed ω1 for a preset time period, the drum is accelerated to the second speed ω again, the present current value is sensed at this time, and the laundry amount is determined based on the present current value sensed at the time.

The acceleration of the drum 124 to the second speed ω2 (a second speed acceleration operation) may be repeated as many as a set number of times (A10, A11), and the laundry amount may be determined based on the present current values sensed at the current sensing sections (A81, A82, A83, A84, A85) during the drum 124 being accelerated. The embodiment suggests repeating acceleration of the drum 124 to the second speed ω for, but not limited to, 5 times.

The laundry amount calculation unit 239 may obtain a current integral Iint1 which is integration of the present current value Iq sensed at the current sensing section (A81) as shown with a first equation below.

$$Iint = \int_{t(\theta 1)}^{t(\theta 2)} Iq \, dt$$

The current integrals may also be obtained at current sensing sections (A82, A83, A84, A85) during the second speed ω2 acceleration performed thereafter. Hereafter, the current integrals obtained at current sensing sections (A81, A82, A83, A84, A85) may be called as Iint(1), Iint(2), Iint(3), Iint(4), Iint(5), respectively.

The laundry amount calculating unit 239 determines the laundry amount based on the present current value sensed at the current sensing section. The laundry amount calculating unit 239 may determine the laundry amount LD based on the current integral.

Depending on embodiments, the laundry amount LD may be obtained by summing the current integrals. Weighted values Ki may be given to the current integrals respectively, and a second equation shown below may be an example of such methods.

$$LD = \sum_{i=1}^{m} Ki \left| Iint(i) \right|$$

Where m denotes a number of repetition times of the second speed ω2 acceleration.

The closer to an average of the current integrals, the larger weighted value Ki may be given to the current integral.

Figure 6:
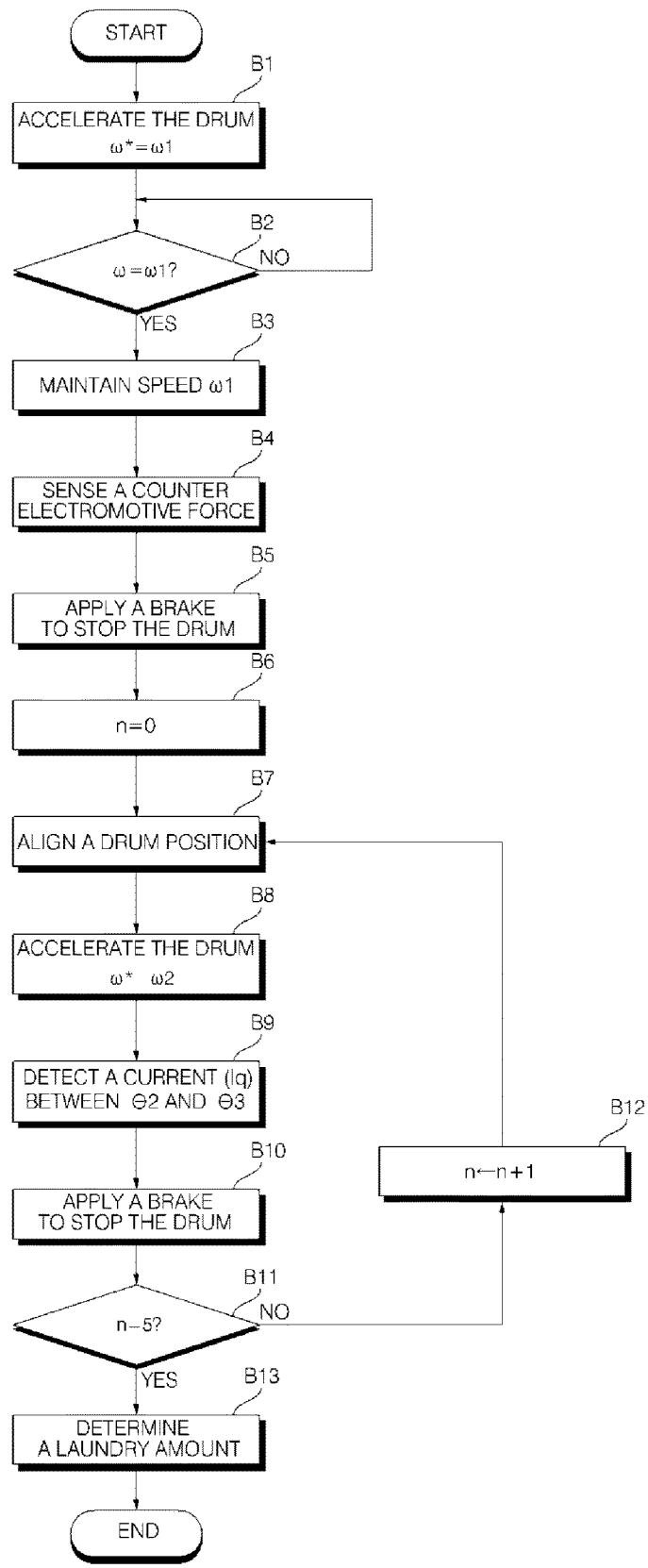
FIG. 6 is a flow chart illustrating a method for controlling a laundry treating apparatus in accordance with an example embodiment.
Figure 7:
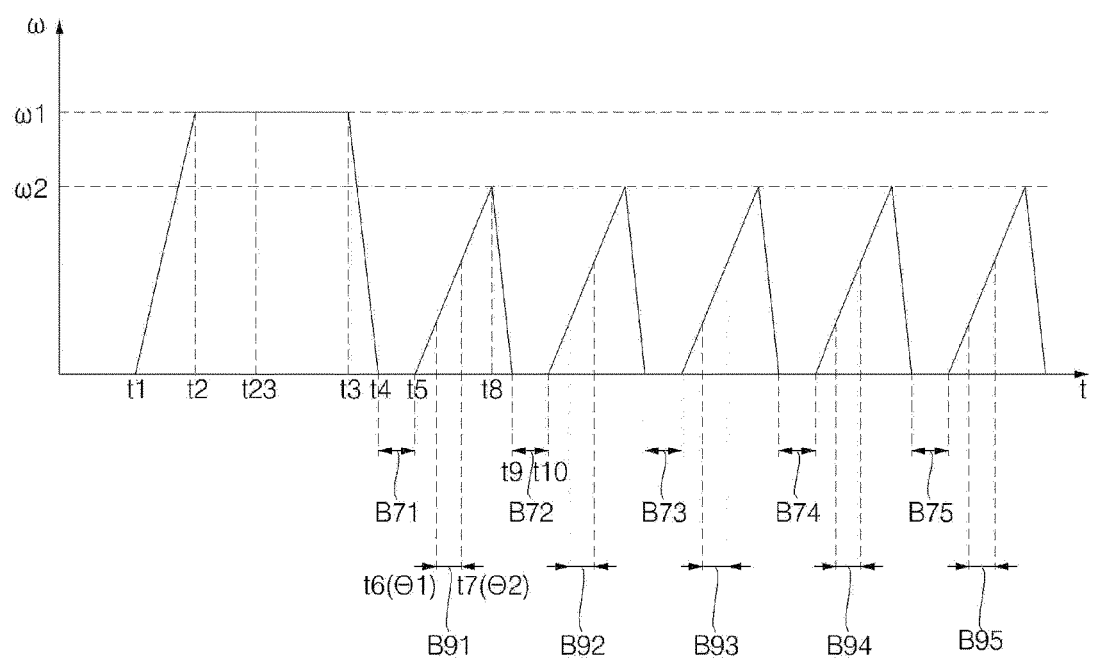
FIG. 7 is a graph illustrating time vs. rotation speed of a drum when a laundry treating apparatus is operated according to a control method in accordance with an example embodiment.

FIG. 6 is a flow chart of a method for controlling a laundry treating apparatus in accordance with an example embodiment. FIG. 7 is a graph illustrating time vs. rotation speed of a drum when a laundry treating apparatus is operated according to a control method in accordance with an example embodiment. A method for controlling a laundry treating apparatus in accordance with an example embodiment will be described with reference to FIGS. 6 to 7. Other embodiments and configurations may also be provided.

The clothes are introduced to the drum 124 and the drum 124 is accelerated (B1, [t1, t2]). A command speed ω* applied to a speed control unit 233 is a first speed ω1, and a rotation speed ω of the drum 124 rises (or increases) following the first speed ω1. The first speed ω1 is a speed that can change a clothes state in the drum 124, required to make at least some of the clothes held in the drum 124 to move, and may be set between 46 rpm to 60 rpm, for example.

If the rotation speed ω of the drum 124 detected at a position detection unit 231 reaches the first speed ω1 (B2), the speed control unit 233 controls the drum 124 to rotate at a fixed speed of the first speed ω1 (B3, [t2, t3]) by a proportional integral control (PI).

The counter electromotive force of the motor 113 is sensed while the drum 124 rotates at the first speed ω1 (B4). A circuit that drives the motor 113 may be expressed with a third equation shown below.

$$Vin = Leq \left| \frac{dI}{dt} + I \right| Req + Vemf$$

Where Vin denotes a voltage applied to the motor 113 from the inverter 250, I denotes a current applied to the motor 113, and Vemf denotes a counter electromotive force of the motor 113. Leq denotes equivalent inductance of the motor 113, and Req denotes equivalent resistance of the motor 113, which are values obtainable by tests in advance.

In an operation in which the rotation speed ω of the drum 124 is controlled by the motor control unit 230 to follow the command speed ω1, the laundry amount sensing unit 239 may obtain the counter electromotive force Vemf based on the voltage value Vin from the inverter 250 and the present current value sensed at the current sensing unit 260. Depending on embodiments, a counter electromotive force sensor may be provided for sensing the counter electromotive force.

The counter electromotive force may be measured after the stator 113a or the rotor 113b is adequately magnetized. The embodiment may suggest measuring the counter electromotive force at a [t23, t3] section, which is a time period after a predetermined time period is passed from a time point t2 when the rotation speed of the drum 124 reaches the first speed ω1. Moreover, since the counter electromotive force is affected by the current value applied to the motor 113, a more accurate counter electromotive force may be obtained only when measured at a time point when speed variation of the motor 113 becomes small owing to inertia of the motor 113, which becomes large adequately, to make variation of the counter electromotive force to become slow adequately in comparison to response of the current control unit 235, i.e., after (After t23) the drum 124 is rotated for a predetermined time period at the first speed ω1.

If a certain time period is passed from the t2 to reach the t3, the brake applied to the motor 113, to stop the drum 124 (B5, [t3, t4]). A braking system of the drum 124 may be regenerative braking or dynamic braking. For counting a number of repetitions of a current detection (B9, B10) to be described later, an 'n' is set to zero (B6).

At a position aligning section [t4, t5] before the drum 124 stopped thus is accelerated again, a position of the drum 124 may be aligned (B7, B71). Magnetization of a stator 113a may be made to make a rotor 113b to be at a regular position, when a d-axis current may output from a current control unit 235, mostly. In this operation, resistance of the motor 113 and an error of voltage information may be detected. The position alignment of the drum 124 may also be performed at a section between acceleration to a second speed ω2 to be described later is repeated (B72, B73, B74, B75).

The drum 124 is accelerated from a stationary state (B8, [t5, t9]). The command speed ω* applied to the speed control unit 233 is a second speed ω2, and the rotation speed ω of the drum 124 rises (or increases) following the second speed ω2. The second speed ω2 may be set lower than the first speed ω1, for an example, 46 rpm.

While the drum 124 is being accelerated, the present current Id/Iq is sensed (B9) at a section (B91) in which a position of the drum 124 changes from a first rotation angle θ1 to a second rotation angle θ2. As described before, the laundry amount may be determined based on the q-axis present current value Iq of the present current values. Thereafter, the brake applied to stop the drum 124 (B10, [t8, t9]), and the operation returns to B7.

The brake is applied to stop the drum 124 (B10, [t8, t9]), and the operation returns to B7.

The acceleration of the drum 124 to the second speed ω2 may be repeated as many as a number of set times (B11, B12), and the laundry amount is determined based on the present current values obtained at current sensing sections (B91, B92, B93, B94, B95) respectively during the drum 124 being accelerated. The embodiment suggests repeating the acceleration of the drum 124 to the second speed ω2 for, but not limited to, five times.

Alike the foregoing embodiment, the laundry amount calculation unit 239 may obtain the current integral Iint, which is integral of the present current value Iq sensed at the current sensing section (B91) (See the first equation above). Such current integrals may be obtained at current sensing sections (B92, B93, B94, B95) during the second speed ω2 acceleration performed thereafter, respectively. The current integrals obtained at the current sensing sections (B91, B92, B93, B94, B95) may be called as Iint(1), Iint(2), Iint(3), Iint(4), Iint(5), respectively.

The laundry amount calculation unit 239 determines the laundry amount based of the present current value sensed at the current sensing section. The laundry amount calculation unit 239 may determine the laundry amount LD based on the current integrals.

The embodiment suggests using, not only the present current value sensed at the current sensing section, but also the counter electromotive force Vemf sensed when the drum 124 is controlled at the first speed ω1, for determining the laundry amount.

The torque generated by the motor 113 is proportional to the counter electromotive force Vemf and the present current value. Therefore, the laundry amount may be determined taking, as factors, the counter electromotive force Vemf sensed at a section the drum 124 is controlled to rotate at a fixed speed, and the present current value sensed at a section the drum 124 is accelerated.

In this example, the present current value may be obtained at any one of the sections (B91, B92, B93, B94, B95) where the drum 124 is being accelerated, alike the foregoing embodiment, by summing the current integrals. The weighted value Ki may be given to the current integrals. (See the second equation above).

According to description up to now, an equation for obtaining the laundry amount LD may be expressed with a fourth equation shown below.

$$LD = Vemf \sum_{i=1}^{m} Ki \left| Iint(i) \right|$$

Where, m denotes a number of repeating times of the acceleration to the second speed ω2.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for controlling a laundry treating apparatus having a drum rotatably provided to hold laundry, a motor to rotate the drum, a motor control unit to control the motor, a current sensing unit to sense a current applied to the motor, and a laundry amount sensing unit to determine a laundry amount based on a current value sensed at the current sensing unit, the method comprising:
   controlling the drum to accelerate the drum to rotate at a first speed;
   sensing a counter electromotive force of the motor while the drum is rotated at the first speed;
   applying a brake to stop the drum from rotating at the first speed;
   after stopping the drum, accelerating the drum to a second speed;
   sensing, by the current sensing unit, a current applied to the motor while the drum is accelerating to the second speed, wherein sensing the current includes measuring the current applied to the motor when a position of the drum changes from a first rotation angle to a second rotation angle; and
   determining, by the laundry amount sensing unit, a laundry amount based on the sensed current and the sensed counter electromotive force.

2. The method of claim 1, wherein the first rotation angle is greater than zero.

3. The method of claim 1, wherein in the sensing of the current, a q-axis current applied to the motor with reference to a d-q axes rotating coordinate system is measured, wherein the dq-axes and the coordinate system are associated with the sensed counter electromotive force.

4. The method of claim 3, wherein the laundry amount is determined based on an integral of the q-axis current at the section in which the position of the drum changes from the first rotation angle to the second rotation angle.

5. The method of claim 1, wherein the second speed is less than the first speed.

6. The method of claim 1, wherein accelerating the drum to the second speed is repeatedly performed, and
   wherein determining the laundry amount includes determining the laundry amount based on current values applied to the motor that are sensed in the repeated accelerating of the drum.

7. The method of claim 1, wherein sensing the counter electromotive force includes sensing the counter electromotive force after the drum is rotated at the first speed for a predetermined time period.

8. A laundry treating apparatus comprising:
   a drum rotatably provided to hold laundry;
   a motor to rotate the drum;
   a motor control unit to apply a brake to stop the motor after rotating the drum at a first speed, and the motor control unit to accelerate the motor such that the drum rotates at a second speed;
   a current sensing unit to sense a current applied to the motor while the motor is controlled by the motor control unit; and
   a laundry amount sensing unit to determine a laundry amount based on a current value sensed at the current sensing unit while the drum is accelerating to rotate at the second speed,
   wherein the laundry amount sensing unit senses a counter electromotive force of the motor based on the sensed current at the current sensing unit while the drum is rotated at the first speed, and determines the laundry amount based on the sensed current and the sensed counter electromotive force,
   wherein the laundry amount sensing unit determines the laundry amount based on the sensed current at a section in which a position of the drum changes from the first rotation angle to the second rotation angle.

9. The laundry treating apparatus of claim 8, wherein the first rotation angle is greater than zero.

10. The laundry treating apparatus of claim 8, wherein the current sensing unit measures a q-axis current applied to the motor with reference to a d-q axes rotating coordinate system, and
    wherein the laundry amount sensing unit determines the laundry amount based on the q-axis current, wherein the dq-axes and the rotating coordinate system are associated with the sensed counter electromotive force.

11. The laundry treating apparatus of claim 10, wherein the laundry amount is determined based on an integral of the q-axis current at a section in which a position of the drum changes from the first rotation angle to the second rotation angle.

12. The laundry treating apparatus of claim 8, wherein the second speed is less than the first speed.

13. The laundry treating apparatus of claim 8, wherein the motor control unit to repeatedly make the drum accelerate to the second speed, and
    wherein the laundry amount sensing unit repeatedly determines the laundry amount based on the sensed current at the current sensing unit while the drum is accelerating to the second speed.

14. The laundry treating apparatus of claim 8, wherein the counter electromotive force is sensed after the drum is rotated at the first speed for a predetermined time period.

* * * * *